United States Patent Office 2,789,955
Patented Apr. 23, 1957

2,789,955
3 SUBSTITUTED CATECHOLS AS ANTI-SKINNING AGENTS FOR COATING COMPOSITIONS

Eugene W. Moffett, Milwaukee, Wis., assignor to Pittsburgh Plate Glass Company, Pittsburgh, Pa., a corporation No Drawing. Application January 30, 1952,
Serial No. 269,111

5 Claims. (Cl. 260—22)

The present invention relates to the prevention of, or inhibition of, the formation of surface films or skins upon certain air drying liquid coating media during periods of storage and it has particular relation to the inhibition of the formation of such films during periods of storage of the media in sealed containers such as tin cans or buckets or the like commonly employed in the retailing of conventional paints, varnishes and lacquers.

It has heretofore been recognized that certain film forming materials such as alkyd resins containing drying oil acids, conjugated drying oils, e. g. tung oil, or other materials which are subject to air drying, may sometimes tend to film over or form skins during storage in containers. In order to obviate, or reduce this tendency, it has been proposed to add to the compositions, small amounts of certain agents termed "anti-skinning" agents, designed to retard or prevent the formation of films during storage. Naturally, it was desirable that these agents, while being effective to prevent the formation of surface films upon the stored liquid compositions, should have but little or no retarding effect upon the normal drying of the materials after they were spread as films upon the surfaces of articles to be coated. Various materials have been proposed as such anti-skinning agents or inhibitors. Heretofore, some of the most successful inhibitors available commercially have been ortho amyl phenol and similar amylated bodies.

The present invention comprises the discovery that certain of the catechols containing hydrocarbon side chains of relatively low molecular weight in the 3 position, are effective as anti-skinning agents in paints, varnishes and similar coating compositions. 3-isopropyl catechol is especially effective as such anti-skinning agent. This material is of the formula:

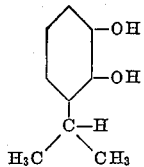

Various paint and varnish compositions are subject to skinning when stored in closed containers. It is within the province of this invention to stabilize any of these with catechols containing hydrocarbon groups in the 3 position. Appropriate coating materials include alkyd resins which are appropriately modified with glyceride drying oils or the partial esters, such as mono and diglycerides of oils such as linseed oil, soya oil, cedar nut oil, or the like. Likewise, the invention includes the inhibition of skinning in conjugated drying oils such as oiticica oil, or more especially, tung oil and others. These oils may be modified with gums such as estergum, "Bakelites," alkyds, etc. The compositions to be stabilized usually contain so-called driers such as the oleate, linoleates, naphthenates and the like soluble organic salts of drier metals such as cobalt, lead, nickel, manganese, chromium, and others in amounts to promote rapid drying. Appropriate amounts of catalysts include 0.01 to 2% by weight of the coating solution, based upon the active metal.

The invention includes the use of various soluble catechols containing an alkyl or phenyl group in the 3 position. The alkyl group may, for example, contain 1 to 6 carbon atoms in a normal or branched chain. Examples of such catechols include 3 methyl catechol, 3 ethyl catechol, 3 n-propyl catechol and 3 phenyl catechol.

The 3 substituted catechols may be employed in varying amounts and the minimum amounts which are effective will vary dependent upon the tendency of the coating composition to skin over during storage. A convenient test to determine an effective amount of anti-skinning agent involves placing a small quantity of coating material such as a drying oil varnish containing driers and such like modifiers and the anti-skinning agent in a sealed container such as a half pint or a pint can and observing the sample at the end of 48 hours of storage for formation of a surface film. If no film is present, it can be assumed that the material is satisfactory from the standpoint of skinning.

Some compositions containing 0.05 pound of the anti-skinning agent are satisfactory. Others may require 0.2 pound per 100 gallons of composition. In general, the proportion of the inhibitor successful for purposes of the invention will fall within a range of 0.001 to 1 pound per 100 gallons of the coating material.

Any convenient method may be employed in the preparation of 3-isopropyl catechol. The following constitutes one such method: Appropriate apparatus comprises a 3 neck, 12 liter glass flask equipped with a mechanical agitator, a water cooled reflux condenser and a thermometer. It is also provided with an appropriate heating device. The following charge is placed in the flask:

|  | Grams |
|---|---|
| Catechol | 4,125 |
| Isopropyl alcohol | 2,250 |
| Sulphuric acid (96%) | 3.637 |
| Water | 2,125 |

The catechol and water are added first and finally the sulphuric acid is incorporated. The mixture is heated with agitation until a temperature of 95° C. is attained and the heat is then turned off. The temperature rises exothermically to a range of 105 to 110° C. during the first hour and there is some evolution of volatile material but after that, there is but little refluxing. The temperature is held at about 105° C. for a total of 4 hours. During this entire time, the mixture is agitated to prevent stratification thereof into liquid layers.

At the end of the reaction period, the mixture is allowed to separate into two layers and the bottom layer is drained away and discarded. The top layer is washed thoroughly with two liters of cold water and then with sodium hydroxide of 10% by weight concentration until residual free sulphuric acid is neutralized. A bottom layer, presumably of water and salts, again forms and is mechanically separated.

The organic layer is freed of water by heating it at atmospheric pressure until a temperature of 150° C. is attained. The residue is then cooled and the product is vacuum distilled. A small forerun is discarded and the main part of the material is distilled until a tar like residue remains in the still pot. In this operation, 3 to 4 liters of distillate passes over and the distillate is cut into 4 equal fractions.

The fractions are allowed to stand overnight and some catechol is found to crystallize from the first two cuts. The liquid phase of each of these fractions is drained off and the fractions are combined and carefully fractionated under vacuum. A small amount of catechol isopropyl ether comes over first and this is followed by catechol boiling in its appropriate range. Subsequently, 3-isopropyl catechol boiling in the range of 170 to 175° C. at 40 millimeters (absolute pressure) is distilled. This material is a solid which melts at 50 to 51° C. This fraction may be employed as an anti-skinning agent for paints or varnishes.

The following examples illustrate the use of 3-isopropyl catechol as an anti-skinning agent in a number of typical coating compositions.

*Example I*

In this example, 3-isopropyl catechol is employed as an anti-skinning agent in a typical alkyd formulation comprising 20 gallons of linseed oil and 100 pounds of an alkyd product which is the polyester of pentaerythritol and a molecular equivalency of a mixture of maleic acid and rosin in which the maleic acid and the rosin are in the respective proportions of 1 to 8 parts by weight. The mixture is heated to insure solution. This mixture is made up into solution in mineral spirits or naphtha to a concentration of 50% by weight of solids. To the solution is added an appropriate drier, namely 0.1% of lead and 0.0225% by weight of cobalt, in the form of soluble compounds (naphthenates). These are conventional in the paint and varnish industry.

A conventional test for the skinning characteristics of a coating composition involves the disposition of small amounts, e. g. 105 milliliters of the vehicle to be tested, in one-half pint tin cans which are then appropriately sealed with a conventional pressure lid. The contents of the cans are examined after 28 hours and again after 48 hours for the formation of surface films or skins. If the materials undergoing tests do not skin or film over within 48 hours, they can be expected to keep indefinitely.

When the above material is stored in a closed container without inhibitor of skinning, under usual storage conditions, a film or skin can be expected to form on the surface thereof within a period of 48 hours.

Conventional procedure involves addition of 1 pound of orthoamyl phenol per 100 gallons of the coating composition, in order to protect the latter against surface film formation during storage.

For purposes of test, a 3 substituted catechol is added to samples of the foregoing material in a proportion of 0.05 pound per 100 gallons of material. The material will successfully withstand the storage test without formation of a film. It is thus found that the inhibiting effect of 3-isopropyl catechol is approximately 20 times as great as that of orthoamyl phenol conventionally employed as an anti-skinning agent.

Although 3-isopropyl catechol is highly effective as an inhibitor of skinning of coating compositions stored in containers, it has very little, if any, effect upon the rate of cure of films formed of the material containing the inhibitor. For example, films formed by brushing, or otherwise spreading a material of the foregoing composition containing the 3-isopropyl catechol, upon appropriate test panels may be air dried in conventional manner and the rate of dry is practically as fast as that of control panels in which the coating composition is of the same materials except for the omission of the anti-skinning agent.

The use of any air-drying coating material, such as drying glyceride oil modified alkyds or the like, which are subjected to skinning during periods of storage, is within the scope of the present invention.

*Example II*

This example illustrates the use of 3-isopropyl catechol as an anti-skinning agent in a typical varnish comprising tung oil as its main component. The varnish comprised 200 pounds of ester gum dissolved in 25 gallons of tung oil and being thinned with 68 gallons of mineral spirits. A soluble drier composition, namely a mixture of organic salts of cobalt and lead was added in such amount that the solution contained 0.046% by weight of cobalt and 0.13% by weight of lead. To the solution was added 3-isopropyl catechol in a proportion of 0.075 pound per 100 gallons of solution. To test the anti-skinning properties of this solution, 150 milliliter samples thereof were placed in tin cans of pint capacity and were sealed by friction fit lids. The samples were examined after 48 hours and were found successfully to have resisted skinning.

*Example III*

This example illustrates the use of 3-isopropyl catechol as an anti-skinning agent in typical tung oil composition which is modified by a soluble phenol-formaldehyde resin. The composition comprised 100 pounds of a soluble phenol-formaldehyde resin, namely one sold commercially as "Bakelite" BR 9432, dissolved in 33 gallons of tung oil and 40 gallons of mineral spirits. To the solution was added driers namely 0.044% by weight of cobalt and 0.19% by weight of lead, both as conventional organic salts, namely naphthenates. The catalyzed solution was stabilized against skinning by addition of 3-isopropyl catechol in a proportion of 0.2 pound per 100 gallons of solution.

The solution containing the 3-isopropyl catechol as an anti-skinning agent successfully withstood the skinning test described in Example II.

The 3-isopropyl catechol in Examples I, II and III did not appreciably retard drying of the films formed by spreading the solutions upon appropriate test panels.

*Example IV*

Substitute 3-n-propyl catechol prepared by the method of 71 Journal of the American Chemical Society, page 3311 (1949) for the 3-isopropyl catechol of Example I to provide a coating material having anti-skinning properties.

*Example V*

Substitute 3-phenyl catechol described by Allen and Van Allen, Journal of Organic Chemistry, September, 1949, for isopropyl catechol in Example I.

*Example VI*

Prepare 3-ethyl catechol by any convenient method such as that described in a copending application to Earl E. Parker, Serial No. 199,554 filed December 6, 1950. According to this method, a three-necked, one liter glass flask provided with an agitator, a dropping funnel and a water cooled reflux condenser having a terminal calcium chloride drying tube may be employed as a reaction vessel. Magnesium methyl iodide is prepared in the flask from 27 grams of magnesium and 142 grams of methyl iodide in 200 milliliters of diethyl ether. The resultant reaction is exothermal and the temperature can be expected to rise to about 75° C. At this point, a 100 milliliter portion of benzene is added and the mixture is allowed to stand for 40 minutes, after which the temperature is dropped to 36° C. To this mixture, a 125 gram portion of 2,3-dimethoxy benzaldehyde dissolved in 200 cc. of benzene is added over a period of one hour and at the conclusion of this period, the temperature of the reaction mixture is raised to 65° C. The mixture is then stirred for an additional hour, poured into ice and the aqueous layer is adjusted to a pH value of 7. The intermediate product, 2,3-dimethoxy 3-alpha-hydroxy ethyl benzene is obtained in solution. The latter product is converted to 2,3-dimethoxy styrene as follows:

The organic layer is mechanically separated from the aqueous layer above described and the latter layer is extracted with a 200 milliliter portion of benzene. The benzene extract solution is added to the organic layer in a round bottom flask and is blown with inert gas (e. g. $CO_2$) while it is heated to 140° C. A 20 gram portion of potassium hydrogen sulfate is added to the mixture at this point and the mixture is heated at 210 to 200° C. for 20 minutes. The heating operation is conducted under a reflux condenser with a trap designed azeotropically to remove water from the system and to return benzene to the system. A total of 7.5 milliliters of water is collected. The organic material is distilled under vacuum and 31.31 grams of 2,3-dimethoxy styrene is collected in 4 cuts. The third cut has a boiling point of 93° C. and five millimeters pressure (absolute). The refractive index is 1.5485 at a temperature of 25° C. The dimethoxy styrene is converted to 2,3-dimethoxy ethyl benzene as follows:

All four cuts of the 2,3-dimethoxy styrene are placed in a shaking type bomb or autoclave lined with stainless steel and of a capacity of 1 liter. Five grams of hydrogenation catalyst namely, 5% palladium on carbon as a carrier, and 200 milliliters of isopropyl alcohol are added. Air is purged from the system with hydrogen. The mixture is then shaken at 71° C. while under hydrogen gas at a hydrogen pressure of 300 pounds gauge. Hydrogenation is continued overnight or for about 14 to 18 hours. The liquid phase is separated from the catalyst and is carefully distilled. Three fractions having a boiling point range of 75 to 85° C. at 5 milliliters (absolute) are collected. The middle fraction has a boiling point of 83° C. at 5 millimeters and a refractive index of 1.5099. The product is 2,3-dimethoxyethyl benzene.

To convert the 2,3-dimethoxyethyl benzene to 3-ethyl catechol, the three fractions are placed in a one liter round bottom flask along with 200 grams of 48% aqueous hydrobromic acid and 300 grams of acetic acid. The mixture is refluxed under atmospheric pressure for 24 hours and is then blown with inert gas ($CO_2$) until a temperature of 130° C. is attained. A 200 milliliter portion of n-butyl alcohol is added to the liquor and the mixture is washed with diluted caustic until a pH of 6 is attained. The organic layer is separated and distilled under vacuum. The material boiling in the range of 113 to 125° C. at 5 millimeters (absolute) pressure contains the desired product, namely 3-ethyl catechol.

The 3-ethyl catechol prepared in the manner above described is substituted for 3-isopropyl catechol in Example I to provide a coating material having anti-skinning properties.

*Example VII*

Reduce dimethoxy benzaldehyde to 2,3-dimethoxy methyl benzene with hydrogen in conventional manner and convert the resultant compound to 3-methyl cathechol by the technique outlined in Example IV for the conversion of 2,3-dimethoxy ethyl benzene to 3-ethyl catechol.

Substitute 3-methyl catechol so prepared for 3-isopropyl catechol in Example I to inihibit skinning of the composition during storage.

The forms of the invention herein described are to be regarded as being by way of example. It will be apparent to those skilled in the art that numerous modifications may be made therein without departure from the spirit of the invention or the scope of the appended claims.

I claim:

1. A liquid coating material containing a mixture of a drying glyceride oil and a siccative which is an organic salt of a drier metal, said salt being soluble in glyceride drying oil which mixture is characterized by a tendency to form skins when stored in bulk in a closed container, said material being stabilized against skinning by 3-isopropyl catechol, said catechol being present in an amount to inhibit skinning of a 150 milliliter sample of the material in a closed one pint tin can for at least 48 hours.

2. A liquid coating material containing a mixture of a drying glyceride oil and a siccative which is an organic salt of a drier metal, said salt being soluble in glyceride drying oil which mixture is characterized by a tendency to form skins when stored in bulk in a closed container, said material being stabilized against skinning by 3-isopropyl catechol, said catechol being present in an amount of 0.001 to 1 pound per 100 gallons of the material.

3. The material of claim 2 in which the glycerides are present as modifiers in an alkyd resin.

4. The material of claim 2 in which the glycerides comprise a drying oil containing higher fatty acid ester groups with conjugate double bonds.

5. A liquid coating material comprising tung oil, a siccative which is an organic salt of a drier metal, said salt being soluble in glyceride drying oil and 0.001 to 1 pound per 100 gallons of 3-isopropyl catechol.

References Cited in the file of this patent

UNITED STATES PATENTS

| | | |
|---|---|---|
| 2,181,102 | Stoesser et al. | Nov. 21, 1939 |
| 2,225,918 | Martin | Dec. 24, 1940 |
| 2,457,657 | Glick | Dec. 28, 1948 |
| 2,643,985 | Parker | June 30, 1953 |
| 2,676,947 | Parker | Apr. 27, 1954 |

OTHER REFERENCES

Official Digest, No. 251, Dec., 1945, pages 484–489.